United States Patent [19]

Otstot

[11] 4,348,458
[45] Sep. 7, 1982

[54] COILED INORGANIC MONOLITHIC HOLLOW FIBERS

[75] Inventor: Roger S. Otstot, Raleigh, N.C.

[73] Assignee: Monsanto Company, St. Louis, Mo.

[21] Appl. No.: 184,878

[22] Filed: Sep. 8, 1980

[51] Int. Cl.³ .......................... D02G 3/00; B32B 9/00
[52] U.S. Cl. .................................. 428/366; 428/364; 428/367; 428/371; 428/398; 428/399
[58] Field of Search ............... 428/398, 371, 364, 367, 428/366, 399

[56] References Cited

U.S. PATENT DOCUMENTS

| | | | |
|---|---|---|---|
| 2,296,321 | 9/1942 | Wellech | 49/7 |
| 3,505,039 | 4/1970 | Roberts et al. | 428/398 |
| 3,565,749 | 2/1971 | Wizon | 428/367 |
| 4,056,373 | 11/1977 | Rubin | 55/158 |
| 4,104,445 | 8/1978 | Dobo | 428/567 |
| 4,105,548 | 8/1978 | Baker et al. | 201/23 H |
| 4,175,153 | 11/1979 | Dobo et al. | 428/398 |
| 4,222,977 | 9/1980 | Dobo | 264/63 |
| 4,224,386 | 9/1980 | Levine | 428/398 |

FOREIGN PATENT DOCUMENTS

| | | |
|---|---|---|
| 882224 | 1/1980 | Belgium . |
| 591807 | 7/1925 | France . |
| 1452937 | 10/1976 | United Kingdom . |

*Primary Examiner*—Mary F. Downey
*Attorney, Agent, or Firm*—Thomas E. Kelley

[57] ABSTRACT

Essentially inorganic monolithic hollow fibers have at least one segment self-supportingly disposed as a coil. Coil shapes may be spiral, helical or conical helical. Processes are provided for making coiled hollow fibers. Apparatus are provided using coiled hollow fibers.

17 Claims, 5 Drawing Figures

COILED INORGANIC MONOLITHIC HOLLOW FIBERS

This invention pertains to coil-shaped inorganic monolithic hollow fibers, processes for preparing such fibers and apparatus using such fibers.

These coil-shaped inorganic monolithic hollow fibers have many uses. For instance, they are useful in most applications of inorganic hollow fibers such as in fluid separation devices, in fuel cells, as solid electrolytes in secondary storage batteries, in filters, or in catalyst applications. The unique coil shapes available for these inorganic hollow fibers provide the advantage of having very long lengths of inorganic hollow fiber in a compact space.

A characteristic of these coiled inorganic hollow fibers is that the coil structure is self-supporting. That is, individual turns of the coil-shaped hollow fiber have the structural integrity to maintain their geometry without substantial support from contiguous turns of the coil.

Inorganic coil shapes are generally available for ductile metal materials. There are usually produced by extruding and drawing metal tube followed by a coil winding process. Heat treatment may be necessary to relieve stress in the wall structure created by the coil forming process. Such procedures to form coiled metal tubing of extremely fine diameters and wall thickness, i.e., with hollow fiber dimensions, are particularly expensive and may not be technically viable. The process of this invention provides a novel method of producing coil-shaped hollow fibers in a variety of shapes ranging from very simple coil configurations to extremely complex coil shapes by a procedure that is inexpensive, flexible, fast and operable at low forming and shaping pressures. This process is particularly adapted to providing coil shapes of fine metal tubing, that is, metal hollow fibers.

This invention also provides coil-shaped hollow fibers of brittle inorganic materials which are not generally adaptable to traditional extrusion, drawing or coil shaping techniques. These brittle inorganic coil-shaped hollow fibers can also be produced in a variety of coil configurations including complex shapes of extremely long lengths of hollow fiber. These coil-shaped hollow fibers of brittle inorganic materials are provided in a coil structure which is self-supporting. This self-supporting characteristic allows brittle inorganic hollow fibers to be shaped as coils with separately spaced turns which do not depend on contiguous turns of the coil for structural support, for instance axial, radial or lateral structural support.

This structural self-supporting characteristic is significantly different from the inorganic hollow fiber structure in U.S. Pat. No. 4,105,548. In that patent, Baker, et al., disclosed a rigid porous inorganic hollow fiber structure arranged in a three-dimensional network of criss-crossing hollow fiber. Their three-dimensional network is a spiral wound structure of hollow fiber in multiple layers, with adjacent layers crossing and supporting the hollow fiber of adjacent layers. Baker, et al., recognized many of the disadvantages of straight lengths of inorganic hollow fibers, but disclosed a structure of limited utility requiring multiple windings of porous inorganic hollow fiber.

U.S. Pat. No. 4,175,153, which pertains to anisotropic inorganic hollow fibers, discloses a procedure to twist a plurality, i.e., two or more, of precursor hollow fibers into a cord which will maintain this configuration after subsequent steps to convert the precursor fibers to metal fibers. While each single strand of hollow fiber in a twisted cord is in the form of a helix, it is often preferred that the coil of hollow fiber be separate and not in a cord. These preferred single hollow fiber coils can have a loop diameter much larger than that of a twisted cord and can have the loops of the coil much closer than those of the twisted strand in a cord.

In the description of the present invention the following definitions are used in the patent application.

The term "hollow fiber" as used in this patent application means a seamless fiber or monofilament which has a length which is very large as compared to its diameter and has an axially disposed continuous bore which is devoid of the material that forms the hollow fiber wall. Such hollow fiber can be provided in any length desired for the use intended. As used in this patent application "hollow fibers" have physical characteristics of tubing.

SUMMARY OF THE INVENTION

The present invention provides an essentially inorganic brittle monolithic hollow fiber having at least one segment self-supportingly disposed as a coil. Preferred forms of these fibers have a coiled segment which is spiral, helical or conical helical. Preferred fibers comprise brittle inorganic material which is not malleable at moderate temperatures, for instance, metal oxides such as alpha alumina or iron oxide, oxidized metal compounds including borides, carbides or nitrides such as titanium carbide, semi-metal compounds such as silicon carbide or boron carbide, ceramics such as sodium beta alumina, and cermets such as iron metal/aluminum oxide.

The present invention also provides a novel method of producing inorganic monolithic hollow fiber having at least one segment self-supportingly disposed as a coil. This process comprises (a) extruding through a hollow fiber spinneret a solution of an organic fiber-forming polymer containing, in uniformly dispersed form, sinterable inorganic material; (b) forming a polymeric precursor hollow fiber laden with the sinterable inorganic material; (c) shaping at least one segment of the polymeric precursor hollow fiber into a coil configuration; (d) treating the coil-shaped polymeric precursor hollow fiber to remove the organic polymer; and (e) sintering the resulting inorganic material forming an inorganic monolithic hollow fiber with at least one coil-shaped segment. A preferred form of the process involves shaping the polymeric precursor hollow fiber on a cylindrical mandrel to form a helical coil-shaped hollow fiber which can be further processed to produce a helical coil-shaped inorganic monolithic hollow fiber. Another preferred form of the process involves shaping the polymeric precursor hollow fiber into a spiral-shaped coil which is also further processed to produce a spiral-shaped inorganic monolithic hollow fiber.

This invention also provides improved apparatus employing such coiled hollow fibers. For instance, sodium beta alumina hollow fibers in a spiral or helical coil shape are particularly useful as solid electrolytes in a secondary storage battery having an alkali metal electrode. An advantage of such fibers is that a relatively large amount of fiber surface area for mass transfer can be confined in a relatively small volume with a minimum number of electrode header seals.

DETAILED DESCRIPTION OF THE INVENTION

Coiled Hollow Fibers

Figure 1:
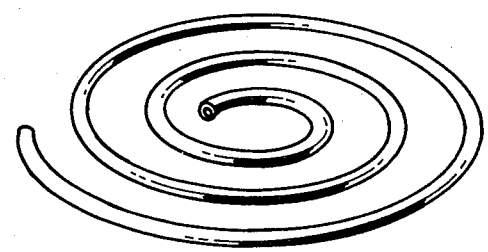
FIG. 1 is an isometric representation of a spirally coiled inorganic monolithic hollow fiber.

The essentially inorganic brittle monolithic hollow fiber of this invention has at least one segment self-supportingly disposed as a coil. Preferred forms of these hollow fibers have a coil segment where the coil is a spiral, helix or a conical helix. These hollow fibers have unique properties characterized by large surface areas (both within the wall structure and at the internal and external surfaces of the hollow fiber) within the unit volume of the coil configuration. The coiled hollow fibers provided by the present invention are particularly advantageous in numerous fields; for instance, they are useful in secondary storage batteries (as solid electrolytes), in fluid separation devices (as support for separation membranes and as the membrane itself), and in filters, fuel cells, catalyst supports, etc. The coil configurations permit a greater length of hollow fiber to be confined in a more compact volume than is otherwise attainable. An additional advantage is that coiled hollow fibers allow a significant reduction in the number of connections of the hollow fibers to a fluid reservoir.

Another unique feature of the fibers of this invention is that the hollow fibers having at least one segment self-supportingly disposed as a coil are monolithic. That is, the material comprising such hollow fibers has the same composition throughout its structure. The coil configuration of such hollow fibers is formed from the plastic material of the polymeric precursor hollow fiber. The hollow fiber having at least one segment self-supportingly disposed as a coil maintains its self-supporting physical configuration due to bonding between its sintered particles. This results in the self-supporting monolithic structure of the coil-shaped hollow fiber.

The hollow fibers having at least one segment self-supportingly disposed as a coil of this invention comprise essentially inorganic material which is sintered in hollow fiber form having the desired coil configuration. This sinterable inorganic material comprises a very large group of materials. The preferred sinterable inorganic materials are those which are sinterable to produce brittle inorganic materials. These brittle materials are not malleable at moderate temperatures. That is, if a coil-forming stress was applied to ordinarily straight lengths of hollow fibers of these materials the hollow fiber wall would shatter, crack, or otherwise be destroyed. Such brittle inorganic materials comprise for instance brittle metals such as tungsten, brittle metal alloys such as cast iron, metal oxides such as alpha alumina or iron oxide, oxidized metal compounds including borides, carbides and nitrides such as titanium carbide, semi-metal compounds such as silicon carbide or boron carbide, ceramics such as sodium beta alumina, cermets such as iron metal/aluminum oxide and metcers.

Apart from the various configurations of the coil the hollow fiber itself may have a wall of variable cross section. For instance, the hollow fiber wall may have a circular annular cross section. Alternatively, oval-, rectangular-, or lobe-shaped annular cross sections may be preferred for the hollow fiber wall. The shape of the cross section of the hollow fiber wall can be influenced by the process of shaping the coil.

The outside diameter, wall thickness and overall length of these inorganic hollow fibers having at least one segment self-supportingly disposed as a coil can be rapidly changed and easily controlled within desired specifications. Such coiled hollow fiber of a generally circular annular cross section can have an outside diameter ranging from about 100 microns to about 10,000 microns. As mentioned above an originally circular annular cross section of a hollow fiber can be distorted by the coil shaping process into a coiled hollow fiber with a wall having a substantially oblong annular cross section having a major axis diameter much larger than its minor axis diameter. With severe distortion in the coil shaping process, the hollow fiber wall can be transformed to a substantially lobe-shaped annular cross section.

Hollow fibers with an average outside diameter of generally less than about 5,000 microns are preferred. More preferred are hollow fibers with an outside diameter of less than about 2,000 microns. Wall thicknesses can range from about 20 microns to about 1,000 microns. These hollow fibers having at least one segment self-supportingly disposed as a coil can be in any length desired.

The internal wall structure of these inorganic hollow fibers having at least one segment self-supportingly disposed as a coil is also variable. It is often preferred that such coiled hollow fiber have a radially anisotropic internal void volume wall structure. That is, the hollow fiber wall has an internal void volume (space within the hollow fiber wall devoid of material that forms the hollow fiber) that varies in a direction perpendicular to the axis of the bore of the hollow fiber. Within the wall of such hollow fibers it is often preferred to have a compact layer which is a relatively dense region (with substantially less and often virtually no internal void volume) and is located in barrier-like relationship to material transported through the wall.

Alternatively, coiled hollow fibers having an isotropic wall structure may be preferred. That is, the wall of the coiled hollow fiber has essentially the same void volume across its thickness. The density of material forming the wall structure will vary depending on its void volume. A relatively non-porous wall structure will have a density approaching the theoretical density, that is, the density of the wall-forming material in its pure crystal structural state. It may be preferred that a coiled hollow fiber with an isotropic wall structure have a density of at least 95 percent of theoretical density, or even 97 percent of theoretical density.

The coil configuration of the hollow fibers of this invention having at least one segment self-supportingly disposed as a coil is variable. A hollow fiber is said to be "disposed as a coil" when the axis of the hollow fiber coincides with a coil. Preferred coil configurations include for instance a coil that is a spiral, a helix, or a conical helix.

The term "spiral" generally applies to a coil of hollow fiber where the axis of the hollow fiber is substantially in one plane and where the axis of the hollow fiber continuously winds around an axis normal to the plane of the coil either receding from or approaching the normal axis. A spirally coiled hollow fiber is shown in FIG. 1.

The term "helix" generally applies to a coil of hollow fiber where the axis of the hollow fiber coincides with a curve traced on a solid surface and where the curve is generated by simultaneous rotation around an axis of the solid surface and translation in a direction parallel to the axis of the solid surface.

Figure 2:
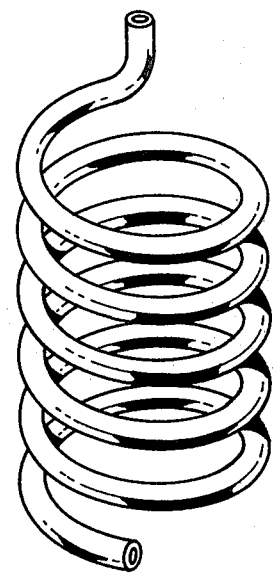
FIGS. 2 and 3 are isometric representations of helically coiled inorganic monolithic hollow fiber, where the turns of the helix are widely spaced in FIG. 2 and closely wound with a pitch equal to the hollow fiber outer diameter in FIG. 3.
Figure 3:
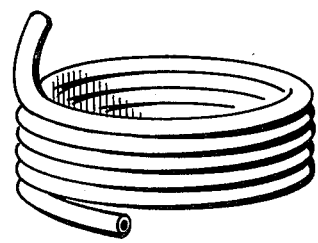
Figure 5:
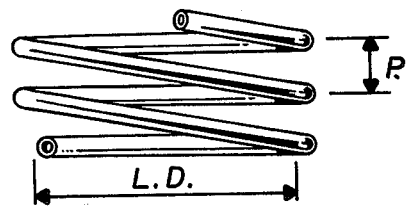
FIG. 5 is a representation of a cylindrically helical coil of inorganic monolithic hollow fiber illustrating the characterizing dimensions of such a helix, where the dimension "P" is the pitch and the dimension "LD" is the loop diameter of a turn of the helix.

The term "cylindrical helix" applies to a coil of hollow fiber where the axis of the hollow fiber coincides with a curve traced on a cylinder where the curve is generated by simultaneous rotation around the axis of the cylinder and translation in a direction parallel to the axis of the cylinder. Helically coiled hollow fibers are shown in FIGS. 2, 3 and 5.

Figure 4:
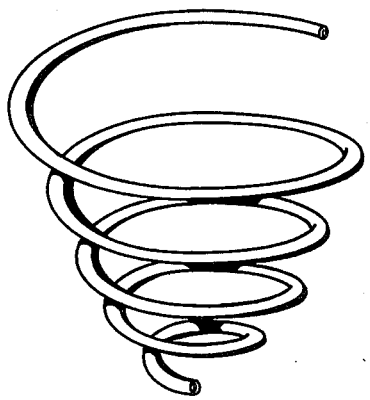
FIG. 4 is an isometric representation of a conically helically coiled inorganic monolithic hollow fiber.

The term "conical helix" applies to a coil of hollow fiber where the axis of the hollow fiber coincides with a curve traced on a cone where the curve is generated by simultaneous rotation around the axis of the cone and by translation in a direction parallel to the axis of the cone. A conically helically coiled hollow fiber is shown in FIG. 4. Other coil shapes are possible.

The term "turn" refers to one loop of a coil and generally represents the length of hollow fiber defined by a 360 degree rotation around the axis of the coil. Coiled hollow fibers can be graphically described by measurements relative to the coiled axis centered within the bore of the hollow fiber: for instance, the pitch and the loop diameter, as depicted in FIG. 5. The pitch is the distance between corresponding points of successive turns of a coil. The loop diameter is twice the distance measured normal to and from the axis of the coil to the coiled axis centered within the bore of the hollow fiber comprising the loop.

The hollow fiber may be prepared such that there is only one coil-shaped segment in the length of hollow fiber. Alternatively, there may be a plurality of segments of a hollow fiber each self-supportingly disposed as a coil. The multiple coil shapes within a length of hollow fiber may be similar in geometry or variable. To provide utility in an apparatus one end of the hollow fiber may be disposed for instance as a straight length of hollow fiber running tangentially or at an angle from the coil shaped. Such a straight length of hollow fiber can be sealingly connected to a barrier that separates working fluids within an apparatus.

One preferred hollow fiber is an essentially inorganic brittle monolithic hollow fiber having at least one segment self-supportingly disposed as a spiral. Such a spirally coiled hollow fiber will have one or more turns disposed in a plane, as shown in FIG. 1. The successive turns of such a coiled hollow fiber will have varying loop diameters as the spiral recedes from or approaches an axis normal to the plane of the coil. The spiral can be tight or loose. For example, in a tight spiral the pitch, the distance between corresponding points of successive turns of the coil, will approach the diameter of the hollow fiber.

Another preferred fiber is an essentially inorganic brittle monolithic hollow fiber having at least one segment self-supportingly disposed as a helix, as shown in FIGS. 2, 3 and 5. A cylindrically helically coiled hollow fiber can be characterized by the ratio of the pitch to the loop diameter, "P/LD". This P/LD ratio can range from near zero to near infinity depending on the configuration of the cylindrical helical coil. For instance, a cylindrically helically coiled hollow fiber having a relatively large loop diameter and/or successive turns in close proximity will have a P/LD ratio that approaches zero, for instance as depicted in FIG. 3. A cylindrically helically coiled hollow fiber having a relatively small loop diameter and/or having successive turns of the coil widely spaced would have a P/LD ratio of pitch to loop diameter approaching infinity. An example is one of the twisted fibers in a cord. The cylindrically helically coiled hollow fibers can be provided with more than one segment of the hollow fiber self-supportingly disposed as a helix. For example, successive coiled segments can be concentrically, but still self-supportingly, disposed. That is, a length of hollow fiber can be provided with a cylindrically helically coiled segment of one diameter disposed concentrically outside of, but separate from a second cylindrically helically coiled segment of a smaller diameter, etc.

Still another preferred fiber is an essentially inorganic brittle monolithic hollow fiber having at least one segment self-supportingly disposed as a conical helix, as shown in FIG. 4. The curvature of such a coiled hollow fiber is represented by a curve generated by simultaneous rotation around the axis of a cone and by translation in a direction parallel to the axis of the cone. As with other coil shapes the pitch and loop diameter of a conically helically coiled hollow fiber are variable. Successive coiled segments of a hollow fiber having a conically helical-shape can also be disposed where the successive segments are arranged concentrically but still independently self-supportingly to each other. Such an arrangement would represent a stack of conically helically coiled hollow fibers.

A principal advantage of the fibers of this invention is that an otherwise relatively long length of essentially inorganic brittle monolithic hollow fiber can be disposed in a more compact economical volume as a coil. A concurrent advantage is that the number of sealed connections of hollow fiber to a fluid separating barrier can be significantly reduced. A still further advantage is that the coil configuration of the brittle inorganic hollow fiber has the inherent spring-like property of being able to absorb a relatively large amount of shock or stress without fracture or other deleterious effect. That is, the hollow fiber disposed as a coil is able to withstand compressive, extensive, flexural or torsional stress to a much higher degree than straight lengths of the same brittle inorganic hollow fiber.

These inorganic hollow fibers having at least one segment self-supportingly disposed as a coil can be formed in a continuous manner using low extrusion pressures (less than 50 kg/cm$^2$ and usually less than about 10 kg/cm$^2$) at linear production rates greater than 180 cm/min.

The process of this invention is described more particularly below.

PROCESS TO PRODUCE THE COILED HOLLOW FIBER

A mixture which comprises sinterable inorganic material, in uniformly dispersed form, in a polymer solution is prepared. The polymer solution comprises a fiber-forming organic polymer dissolved in a suitable solvent. In general, the concentration of the organic polymer in the solution is sufficient to form, when the solution contains sinterable inorganic material, the polymeric precursor hollow fibers by dry and/or wet spinning techniques. The polymer concentration can vary over a wide range and depends on the characteristics desired in the final hollow fiber. The maximum concentration is, of course, limited to that where the polymer solution containing the sinterable inorganic material is not amenable to extrusion through a spinneret. Correspondingly, the lower limit is where the polymeric precursor hollow fiber does not have sufficient polymer to maintain its wall structure.

The nature of the organic polymer employed in the preparation of the polymeric precursor hollow fiber according to this invention is not critical; for example, polyacrylonitrile, polymers of acrylonitrile with one or more monomers polymerizable therewith such as vinyl acetate, methyl methacrylate, urethanes and vinyl chloride may be used. Both addition and condensation polymers which can be cast, extruded or otherwise fabricated to provide hollow fibers by dry or wet spinning techniques are included. Typical polymers suitable for use in the process of the present invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers, polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramidediisocyanate); polyurethanes; polyesters including polyarylates, such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly (4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyallyls; poly(benzobenzimidazole); polycarbodiimides; polyphosphazines, etc., and interpolymers, including block interpolymers containing repeating units from the above such as terpolymers of acrylonitrile-vinyl bromide-sodium salt of parasulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups; monocyclic aryl; lower acyl groups and the like.

Furthermore, since the organic polymer is to be treated to remove it in subsequent steps of the process, it should be amenable to this treatment. For instance, a more preferred polymer would be one that readily decomposes and/or reacts before melting, but not at an excessively rapid rate to effect its removal. Still further, such polymers should not form reaction products that will adversely interact with the inorganic materials or interfere with the subsequent steps in the process.

Obviously the cheapest and most readily available polymers are preferred. Polymers of acrylonitrile and copolymers of acrylonitrile with one or more monomers polymerizable therewith are particularly useful in the process of this invention.

The solvents used in the preparation of the polymer solution can be any number of those well known to those skilled in the art. For instance, such solvents as dimethylacetamide, dimethylformamide, dimethyl sulfoxide, etc., are particularly useful with such polymers of acrylonitrile. Obviously the solvent selected should be a good solvent for the organic polymer and should be amenable to the dry or wet spinning techniques contemplated in the subsequent steps of the process.

The polymer solution containing sinterable inorganic material can be prepared by dispersing the inorganic material in the solvent followed by the addition and dissolution of the polymer in the solvent. Any other suitable means of preparing the polymer solution containing the inorganic material is acceptable, for instance, by concurrently mixing the polymer and the solvent followed by the addition and dispersion or inorganic material, etc. It is preferred to disperse the inorganic material in the solvent prior to polymer addition.

Ambient or somewhat higher temperatures are usually quite adequate for the preparation of the polymer solution containing inorganic material. It may be desirable to chill the polymer solution ingredients. Such a practice allows for the addition of heat by high speed mixing without adversely effecting the organic polymer.

The amount of the inorganic material is inversely related to the same general considerations discussed above concerning the polymer concentration in the polymer solution. The maximum amount is limited to that where the polymeric precursor hollow fiber structure can not be maintained because sufficient polymer is not present. The minimum amount is where the inorganic material particles are so widely dispersed that they do not sufficiently fuse or bond during sintering. Normal ratios, by weight, of inorganic material to polymer will range from about 3.5 to about 15.

The ratio of solution to inorganic material is controlled so as to provide a mixture having a very low yield strength. This inorganic material containing polymer solution will have a viscosity ranging from 20–1500 poises at the forming temperature to allow low pressure plastic deformation of the polymer solution into a hollow fiber form.

The process of this invention provides monolithic hollow fibers having at least one segment self-supportingly disposed as a coil comprising essentially inorganic materials which are sintered in coiled hollow fiber form. The inorganic material incorporated into the polymer solution is a sinterable inorganic material (this phrase includes materials from which a sinterable material can be prepared). Such materials constitute an extraordinarily large group of materials that either are suitable as such or that can be converted to the desired sintered inorganic material. The process of this invention is particularly useful in that it can provide coiled hollow fibers where the sintered inorganic material comprising the coiled hollow fibers can be either malleable or brittle. Among the preferred coiled hollow fibers comprising sintered inorganic materials that are malleable are metals. Particularly preferred metals include metals, nickel, iron, copper, etc. and their alloys, such as steels and bronzes. If the desired coiled hollow fiber is to comprise a metal, such as nickel or its alloy, either the metal, its oxide or other compounds that can be ultimately converted to the metal can be used.

A monolithic hollow fiber having at least one segment self-supportingly disposed as a coil may also comprise those sintered inorganic materials which are brittle. If the desired coiled hollow fiber is to comprise a brittle inorganic material, either the brittle inorganic material itself, or a compound that can be ultimately converted to the material can be used. This broad group of brittle sintered inorganic materials include those materials that are not malleable at moderate temperatures, for instance, some metals and metal alloys, such as tungsten or cast iron; metal oxides, such as alpha alumina; oxidized metal compounds, such as titanium carbide; semi-metal compounds, such as silicon carbide or boron carbide; ceramics, such as sodium beta-alumina; and cermets, such as iron metal/aluminum oxide, nickel metal/titanium carbide, etc. For the purpose of illustration, some materials not in the group of brittle inorganic materials are the ductile or malleable metals, such as copper, and amorphous glasses.

The sinterable inorganic material must be uniformly dispersed, e.g., as small particles, throughout the polymer solution. Sufficient mixing must be carried out to achieve such a uniform dispersion. Although some amount of the inorganic material may be dissolved, this is not critical to achieving the objectives of the present invention.

Particle size is an important factor for producing the desired sintered inorganic hollow fiber regardless of the inorganic material utilized. Small particles utilized for dispersion in the polymer solution usually range in size from less than 5 microns, preferably 2 or less microns. When a macro-porous wall structure is desired, much larger particle size may be preferred.

Depending on the polymer and/or solvent utilized, it is often helpful to dry the inorganic material to remove bound water which can be detrimental to the polymer solution.

The polymer solution containing an inorganic material can also contain other additives to assist in preparation and in subsequent steps in the process, particularly for instance, in the extrusion and fiber-forming steps. Wetting agents, such as polyoxyethylene sorbitan monopalmitate, etc., are useful to wet the inorganic material by the solvent of the polymer solution.

In making the coiled hollow fiber of the present invention, a wide variety of extrusion conditions may be employed. The size of the hollow fiber spinneret will vary with the desired inside and outside diameters of the polymeric precursor hollow fiber and the sintered inorganic hollow fiber. The spinnerets generally have a circular extrusion orifice with an outside diameter of, for instance, from about 100 microns to greater than 10,000 microns, with a tubular center pin having an outside diameter of, for instance, from about 75 microns to about 9,000 microns. The bore within the tubular center pin conducts an injection fluid to form the hollow fiber.

As indicated, the hollow fibers having at least one segment self-supportingly disposed as a coil will generally have a circular annular geometry. However, other geometries are possible and may be preferred. These other shapes are obtained by varying the configuration of the hollow fiber spinneret to, for instance, a square-, oval-, oblong-, or lobe-shape.

The polymer solution containing the inorganic material is frequently maintained under a substantially inert atmosphere to prevent contamination and/or coagulation of the polymer prior to extrusion and to avoid undue fire risks with volatile and flammable solvents. A convenient atmosphere is dry nitrogen.

The temperature preparatory for extrusion of the polymer solution containing the inorganic material can vary over a wide range. In general the temperature is sufficient to prevent undesirable effects, such as coagulation or precipitation prior to extrusion. For instance with acrylonitrile solutions, the temperature generally can range from about 15° C. to about 100° C., preferably from about 20° C. to about 80° C.

The pressure to accomplish the extrusion is normally within the ranges understood by those skilled in the fiber spinning arts. The pressure depends on, for instance, the desired extrusion rates, the spinneret orifice size and the viscosity of the polymer solution containing the inorganic material. Of particular note is the fact that relatively low pressures can be utilized with the processes of the present invention. This contrasts with compaction procedures which often require hundreds of atmospheres of pressure to provide compacted articles to be sintered. The extrusion pressures used with the present invention are normally less than 50 kg/cm$^2$ and usually less than about 10 kg/cm$^2$.

Obviously the hollow fibers can be extruded through a plurality of spinnerets. This will enable the concurrent formation of multiple hollow fibers while, for instance, using the same coagulating bath.

In general, fiber-forming spinning techniques are known to those skilled in the synthetic fiber-forming industries. Such procedures can also be readily adapted to the fiber-forming step of the instant invention. These latter procedures are exemplified in U.S. Pat. Nos. 4,175,153 and 4,222,977, both of which are incorporated herein by reference. The fiber-forming step may be conducted using wet or dry spinning techniques, i.e., the spinneret may be in or removed from the coagulating bath. The wet technique is often preferred and may be used for the sake of convenience.

The polymer solution containing sinterable inorganic material is extruded into a coagulating bath while simultaneously injecting a coagulating fluid into the bore of the forming hollow fiber. These coagulating fluids remove and/or displace the organic solvent which in turn causes the precipitation of the polymeric material. This precipitation of the polymer provides sufficient rigidity to the precursor body to prevent its collapse or breakage.

During this coagulation process the structure of the polymeric precursor hollow fiber is developing. That is the fluid extrudate of the polymer solution is developing to a sufficiently rigid polymeric precursor hollow fiber. Until the stable structure is attained, the developing hollow fiber form is said to be the nascent polymeric precursor.

The term "nascent" as used in this patent application means that the structure of the fiber is developing to a stable condition. More specifically, "nascent polymer precursor hollow fiber" denotes the developing hollow fiber structure that originates as an extrudate solution of an organic fiber-forming polymer containing, in uniformly dispersed form, sinterable inorganic material, and develops by coagulation into a solidified polymeric precursor hollow fiber laden with the sinterable inorganic material.

Any essentially non-solvent for the polymer can be employed as the coagulating agent in the coagulating bath. The coagulating bath is normally miscible with the solvent of the polymer solution. The nature of the coagulating agent selected depends on the solvents used for the polymer and the choice depends on criteria known in the field of fiber spinning particularly with respect to hollow fiber wall morphology. A "powerful coagulating agent" will cause the polymer to rapidly precipitate. A "mild coagulating agent" will cause the polymer to precipitate slowly. Conveniently, water may be employed as the primary coagulating agent in the coagulating bath. A preferred coagulating agent is a mixture of water and the polymer solvent (e.g., water and dimethylacetamide). The residence time for the extruded fiber in the coagulating bath is at least sufficient to ensure reasonable solidification of the fiber.

The temperature of the coagulating bath may also vary widely, e.g., from $-15°$ to $95°$ C. or more, and is most often about $1°$ to $60°$ C.

In providing these hollow fibers it is sometimes preferable to use gas as the injection fluid in the bore of the fiber. The injected gas is at a pressure sufficient to maintain the walls of the hollow fiber without significant distortion by collapse or expansion. The injected gas also serves as a mild coagulating agent.

When gas is used as the injection fluid the hollow fiber may become buoyant causing it to float on the coagulation bath surface. The exposed surface of the floating fiber can be wet by a spray of the coagulation bath fluid. However, it is preferred to keep the fiber submerged with guides.

After coagulation the hollow fiber may be washed to remove solvent for instance by washing with the coagulating bath solution or with a non-solvent that is miscible with the solvent of the polymer solution. The polymeric precursor hollow fiber may also be stored in a water or other liquid bath.

After coagulation the polymeric precursor hollow fiber is generally sufficiently plastic to allow the fiber to be shaped into a coil configuration. To form a spiral the polymeric precursor hollow fiber can be wound about itself for instance on a rotating table. To form a helix the polymeric precursor hollow fiber can be wound on a cylindrical mandrel. To form a conical helix, a cone-shaped mandrel can be used. Other shapes can be obtained by winding the polymeric precursor hollow fiber on an appropriately shaped mandrel.

After formation of the coiled polymeric precursor hollow fiber laden with inorganic material it can preferably be dried to remove volatiles or dried and stored, or transferred directly to a treatment to remove the organic polymer from the hollow fiber. Because the polymeric precursor hollow fiber is somewhat resilient it is often preferred to use some means to restrain the coiled polymeric precursor hollow fiber, for instance, on the mandrel. Upon drying the polymeric precursor hollow fiber will attain some degree of rigidity. However, it is generally preferred to use some means of restraint to maintain the coiled configuration during further processing.

During the drying process in which volatiles are removed the coiled polymeric precursor hollow fiber will undergo substantial size reduction in the fiber diameter, wall structure and length. As the length of the fiber shrinks upon drying the loop diameter of the coil will also be reduced. If a rigid mandrel is used to support the coiled polymeric precursor hollow fiber, there may be considerable distortion of the cross section of the shrinking hollow fiber. That is, an originally circular annular cross section of a hollow fiber may be compressed into an oval or flattened annular cross section.

The use of a rigid mandrel may also create excess linear stress in the coiled hollow fiber resulting in cracking in the coiled loops. Stress and distortion resulting from the shrinking can be avoided by use of a compressible mandrel. For instance, a layer of compressible elastic foam located between the rigid supporting mandrel and the coiled polymeric precursor hollow fiber is often adequate to absorb the compressive stresses associated with the shrinkage resulting from drying. For instance, in the case of forming a cylindrical helical-shaped polymeric precursor hollow fiber, mandrels can be prepared by covering a metal pipe or rod with flexible rubber pipe insulation. Grooves can be longitudinally cut at 90 degree intervals in the outer surface of the flexible rubber pipe insulation. The outer surface of the flexible rubber is then loosely covered with a polymester film with creases of the film inserted in the longitudinal grooves so that, as the polymeric precursor hollow fiber helical coil shrinks compressing the flexible rubber, the film is taken up by the narrowing grooves in the flexible rubber. This results in a smooth compression absorbing surface.

When the polymeric precursor hollow fiber has been shaped into the coiled configuration, the coil-shaped polymeric precursor hollow fiber can be treated to remove the organic polymer. This can generally be accomplished by heating. For instance, the polymeric precursor hollow fiber can be heated to decompose the organic polymer followed by reacting the residual organic material in an oxidizing environment.

While an oxidizing environment is desirable to aid maintaining the inorganic oxides that are used in solid electrolyte applications, other environments may be preferred. For instance, an inert or reducing environment may be used to aid in the reduction of a metal oxide material where metal hollow fibers are desired. Often a combination of inert, oxidizing or reducing environments will be employed. For instance, an inert environment, such as a nitrogen purge stream, will be used as the polymeric precursor hollow fiber is heated in an oven. As the temperature rises, the remaining volatile components of the hollow fiber will outgas and the organic polymeric material will decompose, usually to gases and residual carbon. When the temperature reaches a certain stage, an oxidizing environment can be employed, for example by supplementing the nitrogen purge stream with an oxygen stream, to react with residual carbon or other organic material.

For the purpose of this invention, it will be understood that the temperature range at which polymer removal and oxidation or reduction will occur and the sintering temperatures may overlap to some extent. In the case of solid electrolyte material, some sintering may occur at the temperatures at which polymer removal and oxidation is carried out. Such sintering is sufficient to maintain the inorganic material in the coiled hollow fiber structure.

The resulting coiled inorganic hollow fiber may then be conducted directly into a sintering environment. There exist a number of processes which will accomplish the sintering of the inorganic hollow fiber. The term "sintering" is meant to include an agglomeration by fusion and bonding of the sinterable inorganic material to at least that point at which the particulate material forms a coherent structure. When it is sintered, the inorganic material maintains the structure of the coiled polymeric precursor hollow fiber. This produces the inorganic hollow fiber having at least one segment self-supportingly disposed as a coil. The sintering process chosen will depend upon the character and composition of the inorganic coiled hollow fiber and the desired final properties which may include density, conductivity, strength, grain size and composition. For instance, well-known sintering processes applicable to sintered metal products are different than those applicable to solid electrolyte structures, which are also known in that field.

During and between the organic polymer removal and sintering steps, suitable conditions must be maintained to avoid damage or destruction to structure and integrity of the fiber wall. A shrinkage ratio (final fiber to polymeric precursor fiber) of from about 0.2 to about 0.9 can be expected. That is, as in the drying process described above, the coiled polymeric precursor hollow fiber is often transformed to the final coiled hollow fiber with substantial size reduction. For instance, the fiber is substantially reduced in length and the fiber outer diameter, and wall structure, although remaining in relative relationships, are also reduced in size. The coil structure will also be proportionately reduced in size. During these steps means must be provided to handle the coiled hollow fiber as it shrinks. For organic polymer removal, a procedure is to place coiled polymeric precursor hollow fiber laden with inorganic material on a support in a stainless steel wire mesh boat. After organic polymer removal, immediately prior to sintering, the coiled hollow fiber may be fairly fragile. At this point, particular care must be taken to provide means to afford such shrinkage without damage to the coiled hollow fiber. For instance, if the coiled hollow fiber is allowed to adhere to a conveying surface at this point it may break as it shrinks.

The wall structure of the hollow fiber having at least one segment self-supportingly disposed as a coil can be substantially isotropic or anisotropic. A hollow fiber having an anisotropic wall structure is one where there are distinct differences in the void volume of the material forming the fiber wall. For instance, a wall structure is deemed anisotropic if the wall has a porous region and a separate dense region. The specific process conditions, described in U.S. Pat. No. 4,175,153, which produce an anisotropic wall structure can be utilized in the process of this invention to produce an essentially inorganic anisotropic monolithic hollow fiber having at least one segment self-supportingly disposed as a coil. The resulting fibers have a radially anisotropic internal void volume wall structure.

COILED INORGANIC HOLLOW FIBER APPLICATIONS

As previously noted the inorganic hollow fibers having at least one segment self-supportingly disposed as a coil of the present invention have numerous fields of application. Since the inorganic material comprising the coiled hollow fiber can be selected from a very large diverse group of materials the coiled hollow fibers are equally diverse in their fields of application. Illustrative of such fields of application are liquid or gas separation devices, fuel cells, secondary storage batteries, filters, catalysis or catalyst supports. Other uses will be readily apparent to those skilled in the art.

An advantage of the coiled hollow fibers of this invention is that a very long length of hollow fiber can be assembled as a coil in a compact economical volume. For instance, one use involves coiled hollow fiber of a ceramic ion-transport material, such as sodium beta-alumina, as a solid electrolyte in a sodium-sulfur secondary storage battery. It may be preferred that such coiled hollow fiber have an isotropic wall structure where the material forming the wall have a density of at least 97 percent of theoretical density. Such a use addresses several problems in the design and construction of such secondary storage batteries. One significant problem is in the art of joining and sealing a solid electrolyte member to an electrode barrier within the battery. Such seals are difficult and costly to make and are a critical part of battery fabrication. The use of coiled hollow fibers of solid electrolyte can significantly reduce the number of such seals required.

The following examples are illustrative of the capability of significantly reducing the number of seals required in a battery with coiled hollow fibers.

EXAMPLE 1

Sodium beta-alumina hollow fiber having a hollow fiber outer diameter of 5000 microns (0.5 cm.) is formed in closely wound helices of 60 turns with a pitch of about 0.5 cm. (that is, the successive turns are substantially in contact). Eight such helices are formed having successive loop diameters of 5, 7, 9, 11, 13, 15, 17, and 19 cm. These helices are concentrically arranged in a sodium sulfur secondary storage battery. Each helix is provided with one closed end for communication with an electrode chamber separator. Eight seals are made where the respective substantially straight lengths of hollow fiber join the electrode chamber separator. These seals secure the solid electrolyte helices to the battery structure and allow communication of the hollow fiber bore with the sodium electrode reservoir. The solid electrolyte arranged in these eight helices has an ion-conductive outside hollow fiber surface area of about 30,000 $cm^2$ in a sulfur electrode cylindrical volume of about 20 cm. in diameter by about 30 cm. long. To attain the same surface area with straight hollow fiber solid electrolyte about 600 sodium beta-alumina hollow fibers having a hollow fiber outer diameter of about 5000 microns in an overall length of 30 cm. would be required. Such an arrangement would of course require one seal for each hollow fiber. By using the helical coil configuration of this example the number of seals is reduced from about 600 to 8. Furthermore, it may not even be possible to fabricate such a large number of seals to allow that number of straight hollow fiber solid electrolytes in the same compact volume of sulfur electrode.

EXAMPLE 2

Sodium beta-alumina hollow fibers can be provided in spiral coiled configurations. These coils, for example, can be provided with one end closed on the inner loop of the spiral and with a substantially straight length of hollow fiber provided from the outer loop of the spiral. The substantially straight length of hollow fiber can be disposed generally tangential to the spiral or perpendicular to the plane of the spiral and can be sealed in an electrode separator to provide communication with a sulfur reservoir. Such spiral-shaped solid electrolyte hollow fibers can be stacked within the sulfur electrode to provide a very high ionic-transport surface area with a minimum number of seals.

A further advantage, that is apparent, is that the use of coiled hollow fiber solid electrolyte allows a significant reduction in the size of the sulfur electrode container. Because exotic metals such as molybdenum are often required to line the sulfur container, the reduction in size provides additional cost savings.

The advantages of using solid electrolyte hollow fiber in a coiled configuration in sodium sulfur secondary storage batteries are illustrative of similar advantages that can be obtained in other fields of art. For instance, inorganic monolithic hollow fibers self-supportingly disposed as a coil are also advantageously useful in fluid separation devices (as support for separation membranes and as the membrane itself), in filters, fuel cells, catalyst supports, etc.

The process of this invention is further illustrated by, but not limited to, the following example.

EXAMPLE 3

Alpha alumina powder was dehydrated by heating in an oven at 800° C. for 12 hours. The alpha alumina powder was then cooled within the oven to 300° C. and transferred to a glass resin pot under a nitrogen purge and allowed to cool to room temperature. 1200 grams of the dehydrated alpha alumina powder was added to 854 cc. of dimethylacetamide (DMAC) in a container equipped with an agitator, thermocouple and vacuum and cooling means. 1.2 cc. of polyoxyethylene sorbitan monopalmitate (a surface active agent) was also added to the container. The mixture was slowly stirred under approximately ½ atmosphere of vacuum and the temperature reduced to −15° C. 200 grams of a copolymer of 92.5 weight percent acrylonitrile and 7.5 weight percent vinyl acetate was then added to the slurried mixture under continuous stirring. After the copolymer had been added, the mixture was agitated at high speed until the thermocouple indicated a temperature of 79° C. near the agitator blades.

This fiber-forming organic polymer solution containing alpha alumina powder was then transferred to a polymer spinning line dope pot. The spinning line comprised a pressurized dope pot, a hollow fiber spinneret, a pressurized metering pump, a coagulating bath and a take-up device. The hollow fiber spinneret had an orifice with an outer diameter of 4,980 microns with a concentric tubular central pin injection port having an outer diameter of 3,810 microns. The dope pot was pressurized by the metering pump to force the fiber-forming solution through the hollow fiber spinneret. The polymer solution was extruded in hollow fiber form from the spinneret which was submerged within the coagulating bath. The coagulating bath medium comprised 60 volume percent DMAC and 40 volume percent water at 50° C. Nitrogen gas was injected into the hollow fiber bore through the concentric tubular center pin while the DMAC/H$_2$O coagulating bath enveloped the nascent polymeric precursor hollow fiber exterior. The nascent polymeric precursor hollow fiber extrudate passed over a first Godet roll in the coagulating bath at about 2.8 cm.sec. After coagulation and before drying the polymeric precursor hollow fiber laden with the alpha alumina was sufficiently plastic to be formed into a coil configuration. A helical coil mandrel was prepared from a section of foam rubber pipe insulation having an inside diameter of ⅝ inch (1.6 cm.) with a ½ inch (1.3 cm.) wall thickness. A steel pipe was inserted within the bore of this resilient foam rubber material to provide support. The coagulated polymeric precursor hollow fiber was wound at ¼ inch (0.64 cm.) intervals on this foam rubber mandrel and allowed to dry. Hollow fiber deformation resulting from shrinkage upon drying was minimized as the shrinking helical coil structure compressed into the resilient mandrel. After drying in air the polymeric precursor hollow fiber became sufficiently rigid to maintain the helical coil configuration after removal from the mandrel. The helically coiled polymeric precursor hollow fiber was supported horizontally and placed in an oven for oxidation of the polymeric material. The oven was heated at a rate of 10° C. per minute to a temperature of 800° C. under a nitrogen atmosphere to allow the organic material in the polymeric precursor hollow fiber to decompose. The temperature was maintained at 800° C. for 30 minutes under an oxidizing atmosphere. After oxidation the resultant alpha alumina helically coiled hollow fiber was cooled to ambient temperature under a vacuum. The alpha alumina helically coiled hollow fiber was then placed in a radio frequency induction furnace for sintering. The furnace was heated to 800° C. at a rate of 32° C. per minute then further heated to 1475° C. at 48° C. per minute. After holding at 1475° C. for 6 minutes the oven was heated to 1800° C. at a rate of 25° C. per minute. After being held at 1800° C. for 9 minutes the temperature was lowered to, and maintained at, 1725° C. for 21 minutes and then cooled down to 1375° C. at which temperature the alpha alumina helically coiled hollow fiber was annealed for 2 hours. After cooling to ambient temperature with power off the fully sintered alpha alumina helically coiled hollow fiber had an outer loop diameter of about 1.5 inches (3.8 cm.).

What is claimed is:

1. An essentially inorganic brittle monolithic hollow fiber having an anisotropic internal void volume wall structure, wherein the hollow fiber has at least one segment self-supportingly disposed as a coil.

2. The hollow fiber according to claim 1 which comprises inorganic material selected from the group consisting of brittle metals, brittle metal alloys, metal oxides, metal carbides, metal borides, metal nitrides, semi-metal compounds, ceramics, cermets and metcers.

3. The hollow fiber according to claim 2 where the hollow fiber has an outer diameter of from about 100 microns to about 10,000 microns.

4. The hollow fiber according to claim 3 where the coil is substantially spiral.

5. The hollow fiber according to claim 3 where the coil is substantially conical helical.

6. The hollow fiber according to claim 3 where the coil is substantially helical.

7. The hollow fiber according to claim 4, 5 or 6 where the hollow fiber has a substantially circular annular hollow fiber cross section.

8. The hollow fiber according to claim 4, 5 or 6 where the hollow fiber has a substantially oblong annular hollow fiber cross section.

9. The hollow fiber according to claim 4, 5 or 6 where the hollow fiber has a substantially lobe-shaped annular hollow fiber cross section.

10. The hollow fiber according to claim 6 where the coil has a plurality of turns of substantially equal loop diameter and a pitch substantially equal to the hollow fiber outer diameter.

11. The hollow fiber according to claim 3 having more than one substantially distinct self-supportingly disposed coil-shaped segment.

12. The hollow fiber according to claim 11 where the coil-shaped segments are substantially helical.

13. The hollow fiber according to claim 12 where the helical segments are disposed substantially concentric to each other.

14. The hollow fiber according to claim 11 where the coil-shaped segments are substantially spiral.

15. The hollow fiber according to claim 14 where the spiral shaped segments are substantially parallelly disposed.

16. The hollow fiber according to claim 11 where the coil-shaped segments are substantially conical helical.

17. The hollow fiber according to claim 16 where the conical helical segments are substantially concentrically disposed.

* * * * *